Figure 1:
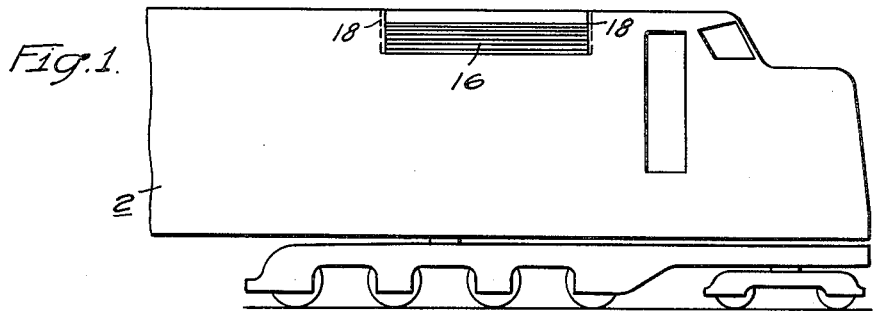

June 20, 1950  C. C. WHITTAKER  2,512,401
GAS-CLEANING MEANS, ESPECIALLY FOR LOCOMOTIVES
Filed July 20, 1946  2 Sheets-Sheet 1

WITNESSES:
E. A. McCloskey
Rev. C. Groome

INVENTOR
Charles C. Whittaker.
BY
B. L. Zangwill
ATTORNEY

June 20, 1950          C. C. WHITTAKER          2,512,401

GAS-CLEANING MEANS, ESPECIALLY FOR LOCOMOTIVES

Filed July 20, 1946          2 Sheets—Sheet 2

WITNESSES:
E. A. McCloskey
Wm. C. Groome

INVENTOR
Charles C. Whittaker.
BY
B. L. ————
ATTORNEY

Patented June 20, 1950

2,512,401

UNITED STATES PATENT OFFICE 2,512,401

GAS-CLEANING MEANS, ESPECIALLY FOR LOCOMOTIVES

Charles C. Whittaker, Pittsburgh, Pa., assignor to Westinghouse Electric Corporation, East Pittsburgh, Pa., a corporation of Pennsylvania Application July 20, 1946, Serial No. 685,010

24 Claims. (Cl. 98—18)

My invention relates broadly to centrifugal means for removing foreign particulate matter from air or other gas by cyclonic action; but it is also specifically directed to improved means of this type associated with a locomotive cab of the modern type which has electrical driving motors or other electrical equipment requiring a large steady supply of clean ventilating air.

A railway car has only limited space, and it is an object of my invention to provide such a car with a rugged, economical and compact gas-cleaning means capable of handling an exceptionally large volume of air for its size, and of smoothly delivering the air, at suitable pressure and with high cleanliness, to the air distributing ducts which lead to the apparatus requiring it.

An important feature of my invention resides in providing a locomotive cab with an air-cleaning system which takes in air at the roof or top portion of the cab, where the air is relatively much cleaner than elsewhere, as much as two to four times as clean as air at, or near, the bottom of the cab. Consequently, a degree of cleaning is also obtained by virtue of the location of the air-inlet openings. In the preferred form of my invention herein described, entering air travelling sideways along the roof of the cab is effectively turned downwardly and is caused to swirl, at a high velocity, around a substantially vertical axis for centrifugally driving most of the particulate matter in the air radially outwardly while the air is travelling the distance from the roof of the cab to the bottom of the cab where the dirt removed from the air is discharged.

For convenience and brevity, I hereinafter call foreign particulate matter in a gas by some terms such as "dust" or "dirt," the terms being used generally as embracing any foreign particulate matter, and not in their specific meanings of solid earthy matter or the like.

A broad object of my invention is to provide a gas-cleaning system having improved means for more quickly causing the incoming gas to reach a high rotational velocity, thereby enabling a decrease in the overall axial length of the gas-cleaning equipment. In the specific embodiment herein disclosed, the equipment comprises spaced concentric tubes about which the incoming gas swirls and the improved means comprises gas-deflectors or vanes which direct the incoming gas most advantageously into the space between the tubes. Additionally, draft-inducing means is provided for forcibly moving the gas through the gas-cleaning means.

A novel feature of my invention resides in the use of the draft-inducing means for an additional purpose or purposes. More specifically, the draft-inducing means comprises a propeller which is arranged near the place where the dust-laden outer portion of the gas is separated from the inner portion of relatively-clean gas, but in such a manner that a part of the propeller functions to forcibly drive this outer portion of the gas into and through the gas-separating means. This is especially advantageous where the gas-cleaning means is associated with a locomotive, because the separated-out air, which is heavily dust laden, can be forcibly discharged through discharge-openings at the floor of the cab, away from the air-inlet openings. Another purpose to which the propeller is put is to reduce the whirl of the gas reaching it, so that the gas leaving the propeller-blades will move more smoothly through the ducts which lead the gas away from the gas-cleaning means.

Figure 2:
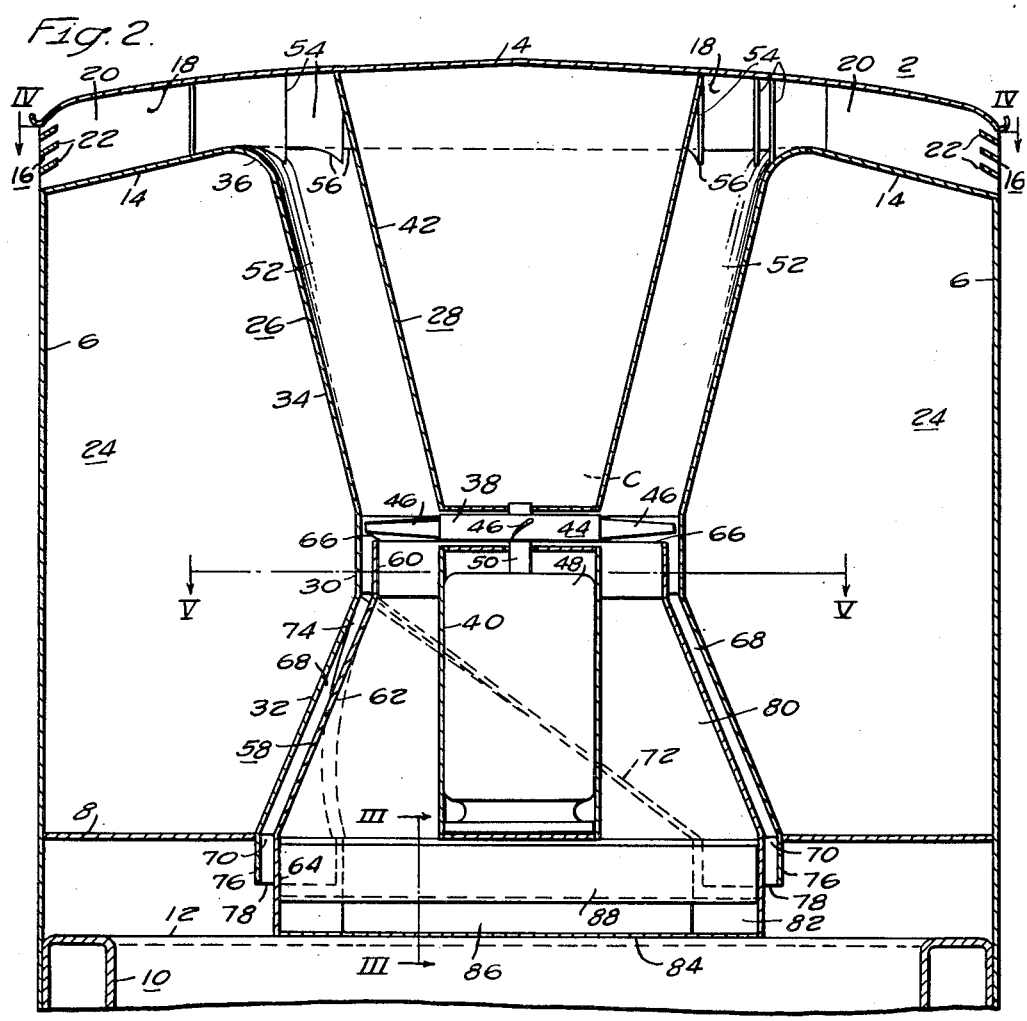
Figure 3:
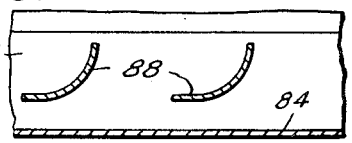
Figure 4:
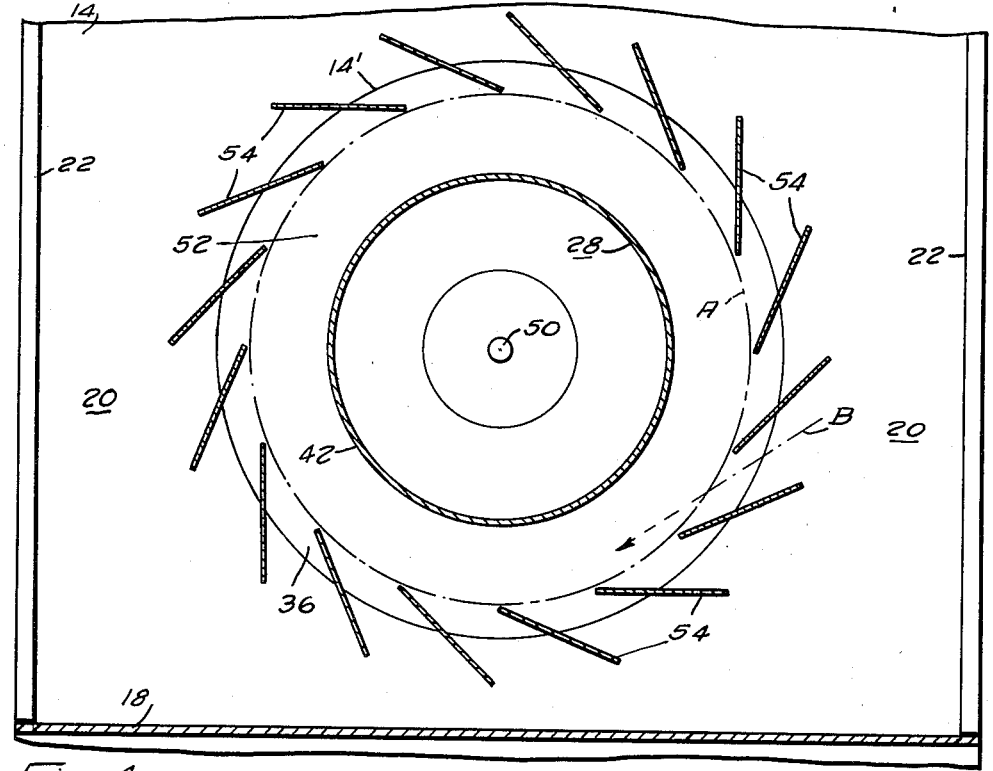
Figure 5:
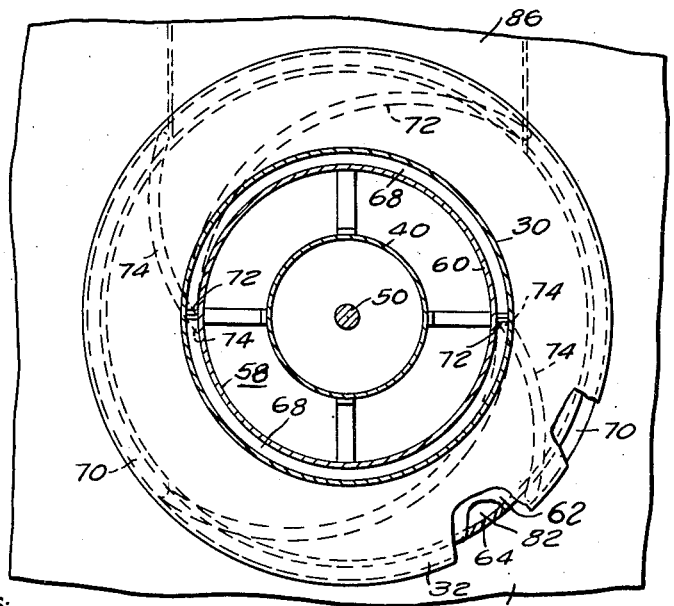

Other novel features, innovations, combinations, subcombinations and methods of my invention, in addition to the foregoing, will be discernible from the following description of a preferred embodiment thereof as applied to an electric locomotive cab. This description is to be taken in conjunction with the accompanying somewhat schematic drawings, in which:

Figure 1 is a side elevational view, on a considerably reduced scale, illustrating part of a locomotive cab embodying my invention, Fig. 2 is a vertical transverse sectional view of this embodiment, along a plane substantially perpendicular to the length-direction of the cab, and centrally through the gas-cleaning equipment, Fig. 3 is a partial sectional view substantially along the line III—III of Fig. 2, and Figs. 4 and 5 are horizontal sectional views substantially long the lines IV—IV and V—V of Fig. 2 respectively.

Referring to the drawings, a locomotive cab is indicated in Figs. 1 and 2 by the reference numeral 2 and comprises a roof 4, sides 6 and a floor 8 carried on an underframe 10 comprising suitable bars including a lateral supporting bar 12 which may carry some of the gas-cleaning equipment. The roof 4 is sloped in a customary manner, being convex upward and sloping symmetrically to the sides of the cab from a highest point at the center. The lateral supporting bar 12 is spaced somewhat below the horizontal floor 8.

Air-intake means for the gas-cleaning equipment is provided at the top of the cab where the air is much cleaner than elsewhere. It comprises a wall 14 spaced from but following the contour of the roof, and provided with what is, in effect, a central circular edge 14' which abuttingly receives a tubular member, as will latter be apparent. The wall 14 terminates at the sides of the cab to form horizontally elongated air-inlet openings 16. A pair of spaced upright walls 18 extend laterally across the cab and define the ends of the openings 16. The walls 14 and 18, together with the roof 4, form substantially horizontal inwardly-directed duct-passages 20 for air entering from each side of the cab. Spaced louvers 22 are provided across the air-inlet openings 16. These louvers, in conjunction with the slope of the duct-passages 20, keep rain, snow and other heavy weather-precipitate from flowing with the gas that passes beyond the duct-passages.

The wall 14 can be a ceiling for aisles 24 at each side of the cab and between which gas-cleaning mechanism is provided extending from the roof 4 down to about the floor 8, and preferably below it. This mechanism comprises a pair of tubes or tubular members arranged in nested spaced coaxial relation, the axis being vertical; and each consists of smaller tubes or tubular members which for the sake of distinction are also referred to in the following description of the mechanism as tube-sections. More specifically, the comprehensive tubular members are referred to in their entireties as an outer tubular member 26, and an inner tubular member 28.

The outer tubular member 26 comprises a plurality of merging tube-sections including a central tube-section 30, in the form of a short hollow cylinder, a downwardly-flared or upwardly-tapered lower tube-section 32 and an upwardly-flared or downwardly-tapered upper tube-section 34 having a top portion which flares sharply outward as it merges into the wall 14, to form a throat-portion 36. The central section 30 is a lower section with respect to the upper section 34.

The inner tubular member 28 consists of several stationary tube-sections and a rotatory tube-section, so that it is not continuous in the sense of the outer tubular member 26. The inner tubular member 28 comprises a narrow rotatable central cylindrical tube-section 38, a lower cylindrical tube-section 40 and an upwardly-flared or downwardly-tapered upper tube-section 42. The central tube-section 38 is also part of a propeller 44 having air-foil blades 46. The lower-section 40 is hollow for receiving an electric motor 48 having a shaft 50 for rotating the propeller 44. The upper tube-section 42 has the same slope as the upper tube-section 34 of the outer tubular member 26, but extends beyond it to the roof 4 which closes its end-opening.

The space between the upper tube-sections 34 and 42 of the inner and outer tubular members respectively forms a gas-passage 52 which converges downwardly toward the blades 46 of the propeller 44. Preferably, the various tube-sections of the tubular members are circles in horizontal cross section with reference to Fig. 2, resulting in a gas-passage which is annular in horizontal cross section.

When the motor 48 is energized, the blades 46 induce a draft downwardly through the gas-passage 52. Incoming air is drawn through the air-intake opening 16, flows in the ducts 20 and enters the gas-passage 52 sideways. The general plane of the duct-passages 20, along which the incoming air flows, is at an appreciable angle to the general direction in which the air must flow downwardly in the gas-passage. For deflecting the air flowing inwardly in the duct-passages 20 into the gas-passage 52, a plurality of circumferentially spaced gas-deflectors are provided completely around the entrance end of the gas-passage. In the preferred form of my invention herein described, these gas-deflectors comprise a plurality of upright vanes 54 which extend partially along the wall 14 and partially along the top portion of the tube-section 34, but are the full height of the passage for the entering air, that is, they reach from the wall 14 or throat-portion 36 to the roof 4. This means that an edge of each vane is shaped so as to rest on the throat-portion 36. The lateral walls 18 are longitudinally spaced apart far enough to clear the nearest vane 54 by an appreciable distance, so that no appreciable hindrance is given to incoming air.

The vanes 54 are arranged to guide the incoming air along smooth flow-lines into a pronounced swirl about the upper tube-section 42 of the inner tubular member 28 but without driving dust to this inner tubular member. To this end, the vanes deflect the air entering the gas-passage toward the inner surface of the upper tube-section 34 of the outer tubular member 26. In explanation of the action, the dashed-line circle A of Fig. 4 may be considered to be the circle on the upper tube-section 34 at which the downstream points 56 of the vanes 54 terminate, and beyond which the incoming air is no longer guided by the vanes. The vanes are approximately, but not quite, tangent to this circle. If extended, each vane would lie on a chord which would be much closer to the circle A than to the concentric circle on the upper tube-section 42, lying in the same horizontal plane. This circle corresponds to that shown in Fig. 4 as representing the inner tubular member 28. The general or average direction which air flowing between two consecutive vanes takes is indicated in Fig. 4 by the dashed-line arrow B. This arrow, if extended would not intersect the circle 28 but would clear it, and so can be said to be approximately tangent to the circle A, for want of a more definite expression. Accordingly, such general air-flow, shown by the arrow B, is intended to be defined in this application by the expression approximately tangent to the inner surface of the outer tubular member. As a result of such air-guidance, the incoming air, leaving the vanes 54, is guided so as to flow close to the inner surface of the outer tubular member 26 without coming as close to the inner tubular member 28. Causing the gas-flow to enter along lines such as the arrow B, causes dust to be projected onto the inner surface of the outer tubular member, instead of onto the inner tubular member as would be the case if the vanes 54 were omitted and air allowed to enter radially. In accordance with my invention, all of the incoming air, while caused to whirl, is also deflected toward the outer tubular member.

In a recommended embodiment, two consecutive vanes made about the same angle of about 22° with each other as they did with the tangents at the points of the equivalent of a circle A such as shown in Fig. 4, which were nearest these vanes. In this embodiment such equivalent of the circle A had a diameter in the neighborhood of 5 feet and a gas-passage, equivalent to the gas-passage 52, of about 8 inches between upper tube-sections. In a device having the aforesaid specific dimensions, the walls, equivalent to the walls 18, could clear the vanes by about 1½ feet, and incoming air would find a natural pattern in flowing into the equivalent of the vanes 54. However, it is to be understood that my invention is not to be limited to these figures or by the recital of them. Considerable variation is permissible so long as a pronounced whirl is encouraged immediately and before the gas comes too close to the inner tubular member.

As the air moves downwardly in the gas-passage towards the propeller 44, the whirl becomes greater because of the decrease in the radius of the airflow lines. The air-borne dust is forced outwardly toward the outer tubular member 26 and is concentrated in an outer part of the flowing air.

A dust-laden outer portion of the air, in which the dust has been concentrated, is separated from the cleaned inner portion by a tubular member or wall which is indicated in its entirety by the reference numeral 58. This wall is on the downstream side of the propeller 44 and has an upper skimmer portion which closely follows, but is inwardly spaced from, the lower part of the outer tubular member 26. This wall 58 comprises an upper wall-member 60, a downwardly-flared wall-member 62 and a lower wall-member 64. The upper wall-member 60 is geometrically similar to the lower part of the central tube-section 30 of the outer tubular member 26. This wall-member 60 has an upper skimmer or air-dividing edge 66 which is close to the blades 46 of the propeller 44 but which is radially inwardly spaced from the extreme tips of the blades so that the tip portions of the blades overlie the annular space between the central tube-section 30 and the upper wall-member 60. The flared wall-member 62 is geometrically similar to the lower tube-section 32; while the lower wall member 64 is partially cylindrical and extends below the floor 8.

The space between the outer tubular member 26 and the wall 58 provides a dirt-receiving duct or passage 68 into which the dust-laden separated-out air flows. A cleaned portion of the air flows in the space inside the wall 58.

The dirt-laden air flowing in the dirt-receiving passage 68 is discarded. Such air enters the substantially completely annular entrance to the passage and is guided to two opposite quadrantal discharge-openings 70 in the floor of the cab by deflectors 72 and 74 which are placed between the tube-section 32 and the wall-member 62. The remaining quadrants at the bottom of the space between the tube-section 32 and wall-member 62 are closed by the floor 8, as indicated in the lower right hand part of Fig. 5. Accordingly, the dirt-laden air is discharged below the floor 8 and between the sides 6 of the cab. An arcuate member 76 may depend from an edge of each opening 70 so as to provide an extension 78 of the gas-passage 68, this extension being directed straight downwardly.

Cleaned air on the downstream side of the propeller 44 is received in the space between the wall 58 and the lower tube-section 40 of the inner tubular member 28, this space forming a conduit or duct 80 which extends from the edge 66 of the wall 58 to a plane about in line with the floor 8. Cleaned air from this duct 80 passes into a compartment 82 formed by the depending lower wall-member 64 and a horizontal wall 84. The incomplete cylinder wall-member 64 is open along a quadrant between the openings 70 and an outlet-duct 86 for cleaned air extends longitudinally from this opening. Air-guiding vanes 88 are provided in the compartment 82 for smoothly turning the gas coming from the conduit 80 into the outlet-duct 86.

An important feature of my invention resides in the multiple functions of the propeller 44. It forcibly induces a draft through the gas-cleaning equipment, although if desired, this action may be augmented by a suction in the outlet-duct 86. However in a locomotive it is preferable for the propeller to supply all of the driving force on the air. The propeller 44 also causes a more forcible separation of the outer layer of the gas from the inner portion, because its tips are over the dirt-receiving passage 68. Dirt along the lower surface of the outer tube-section 34 is forcibly pulled down and driven into the gas-passage 68; and at the same time, a positive gas-moving force is applied at the entrance end of the passage 68 for producing a strong scavenging effect which carries the dirt through the openings 70. (In one embodiment, high gas cleaning and a satisfactory scavenging effect were obtained by skimming off between 5% and 10% of the gas.) Finally, the blades 46 of the propeller are shaped at an angle to the horizontal so that their faces, meeting the oncoming gas, deflect the gas-flow and decrease the swirl of the gas. Such use of the propeller-blades permits the height of the equipment to be reduced because the cleaned gas is introduced into the conduit 80 substantially rectilinearly. With suitably designed apparatus, no stationary vanes are required in the conduit 80. However, such vanes may be added if desired or as a precaution.

From the foregoing, it is apparent that I have provided a gas-cleaning means which is especially advantageous for application to a vehicle such as a locomotive cab. The limited height of a locomotive makes it necessary to start the swirl of the air at once, with the air-borne dust particles as near to the outer tubular member as possible. The gas-deflectors or vanes 54 produce this effect while the propeller creates a strong draft through the gas-cleaning equipment. Between the two, the air can be made to swirl at extremely high velocities, in the order of 4000 to 5000 feet per minute.

The arrangement of the downwardly sloped entrance duct-passages 20 and the louvers 22 prevents snow and the like from entering the gas-cleaning equipment when the motor is not energized. It is for this reason primarily that the openings are not provided in the roof of the cab.

Although I have herein described my invention in connection with a preferred embodiment in which clean air is provided in a locomotive, it is obvious that the gas-cleaning means itself can be operated with other gases as well as air. It is also obvious that my invention is subject to wide modification.

I claim as my invention:

1. A system of a type described for supplying clean air for a vehicle having sides, a roof and a floor, said system comprising air-intake means having horizontal air-inlet openings at the sides of said vehicle and inwardly-directed duct-passages along said roof, a pair of nested spaced upstanding round tubular members providing an upstanding air-passage between said roof and floor, said air-intake means directing air into the upper part of said air-passage, draft-inducing and whirl-inducing means in said air-passage comprising a rotatable air-moving member for forcing air through said air-passage, means near the bottom of said air-passage for separating an outer portion of the air flowing in said air-passage from the rest of the air, the last said means comprising wall-members leading to separate opposite openings in said floor for discharging the separated outer portion to the atmosphere below said floor, and a duct between said openings for cleaned air.

2. A system of a type described for supplying clean air for a railway car having a roof and a floor, said system comprising air-intake means having air-inlet openings along the sides of said railway car and duct-passages along said roof, a pair of nested upstanding tubular members below said roof providing an upstanding air-passage therebetween communicating with said duct-passages, said tubular members being between said sides, a plurality of gas-deflectors at the junction of said duct passages and said air-passage for directing incoming air from said duct-passages circumferentially about the upper part of said air-passage, draft-inducing means comprising rotatable blades at the bottom of said air-passage, skimmer means near the tips of said blades for separating an outer layer of the air in the air-passage from an inner portion of the air, duct means on the downstream side of said blades and extending along said floor for receiving said inner portion of the air, said blades being formed to drive the air while reducing its whirl.

3. A system for supplying clean air for a railway car having a roof and a floor, said system comprising air-intake means having inlet duct-passages along said roof, a pair of nested upstanding tubular members providing an upstanding air-passage, means associated with said air-intake means for directing air about the upper circumferential part of said air-passage, means for inducing a draft in said air-passage, means at the bottom of said air-passage for separating out an outer layer of the air flowing in the air-passage, and wall-means providing an upstanding passage for said separated-out air, said passage extending downwardly from said bottom of said air-passage to an opening in said floor.

4. Gas-cleaning means comprising, in combination, means comprising a first tube and a second tapered tube around and spaced from said first tube providing a converging gas-passage which is substantially annular in cross section, gas-inlet means at the large end of said gas-passage, a plurality of vanes substantially fixed in the gas-flow path for imparting a whirl to gas entering said gas-passage, means for inducing a draft through said gas-passage, comprising an axial-flow-type propeller having blades at the other end of said gas-passage, a round gas-divider wall-member having a portion extending downstream from said blades, the edge of said wall-member being radially inwardly spaced from said second tube, the space between said wall-member and said second tube providing a dirt-receiving passage and space inside said wall-member providing a passage for cleaned gas, and outlet means for the last said passage, said blades being formed to reduce the whirl of the gas entering said outlet means.

5. Gas-cleaning means comprising a pair of nested tubular members, the outer one of said members having an upper section and a lower section, the upper section cooperating with the inner one of said tubular members to provide an upstanding gas-passage therebetween, a gas-inlet means to the upper end of said gas-passage, draft-inducing means for producing a draft through said gas-passage with the gas whirling about said inner tubular member, said draft-inducing means comprising a propeller with blades inside said lower section at the lower end of said gas-passage, dirt-receiving means on the downstream side of said propeller, and a cleaned-gas duct on the downstream side of said propeller.

6. Gas-cleaning means comprising a pair of nested tubular members, the outer one of said members having upper and lower sections flaring away from a central section, the upper section and the inner one of said tubular members providing a gas-passage therebetween, gas-inlet means to the upper end of said gas-passage, draft-inducing means for producing a draft through said gas-passage with the gas whirling about said inner tubular member, said draft-inducing means comprising a propeller with blades inside said central section, a plurality of vanes at the entrance to said gas-passage for directing gas circumferentially about said gas passage, and a skimmer wall-member between said lower section and the inner tubular member, spaced from both.

7. Gas-cleaning means comprising an inner tubular member and an outer tubular member spaced therefrom, said members having downwardly tapered upper sections providing a gas-passage therebetween, means at the lower end of said gas-passage for establishing a draft through said gas-passage, said outer tubular member comprising a lower downwardly flared section, means providing a gas-inlet about the upper end of said gas-passage, a plurality of vane members at the inlet to said gas-passage for directing incoming gas approximately tangentially into said gas-passage at the point of gas-entry, a downwardly flared skimmer wall-member between said lower downwardly flared section and said inner tubular member, said lower section and said wall-member providing a dirt-receiving passage, the inside of said wall-member providing a passage for cleaned gas.

8. Gas-cleaning means comprising, in combination, a pair of nested round tapered tubular members spaced to provide a gas-passage therebetween which converges in a direction from the inlet of said gas-passage, means for inducing a draft in said gas-passage, said means comprising a propeller having blades spaced from said inlet and at the narrow end of said gas-passage, and a skimmer wall forming a dirt-receiving passage having a portion extending downstream from said propeller.

9. Gas-cleaning means comprising, in combination, a pair of nested rounded tubular members spaced to provide a gas-passage therebetween having a gas inlet, means for inducing a draft in said gas-passage with the gas whirling about the inner of said tubular members, said means comprising an axial flow propeller having blades at the outlet end of said gas-passage, and a tubular skimmer wall at the outlet end of said gas-passage, said wall having an edge inside of the outer of said tubular members for skimming off an outer layer of the flowing gas.

10. Gas-cleaning means including that defined in claim 9 but characterized further by said edge of said tubular wall being radially inward from the extreme tips of the blades of said propeller and closely adjacent the downsteam side thereof.

11. Gas-cleaning means in accordance with that defined in claim 9 but further characterized by said edge of said tubular wall being adjacent the extreme tips of said blades, and said wall having a portion extending in a downstream direction from said edge.

12. A system of a type described for supplying clean air to a railway car having a roof, a floor and outer sides, said system comprising a pair of nested upstanding tubular members providing an upstanding air-passage therebetween, said tubular members being between said sides, said car having inlet openings at the top thereof connected to the upper end of said air-passage, means for inducing a downward draft in said air-passage with the air whirling about the inner one of said tubular members, said draft-inducing means comprising an axial flow propeller at the bottom of said air-passage, said propeller having blades faced to reduce the whirl of the air, skimmer means adjacent the bottom of said air-passage for separating out an outer layer of the air flowing in said air-passage, and a duct along said floor for receiving cleaned air from said air-passage, said skimmer means comprising wall means forming upstanding dirt-receiving discharge passages leading to openings in said floor on opposite sides of said duct.

13. Gas-cleaning means comprising, in combination, a pair of nested round tapered tubular members spaced to provide a converging gas-passage, means for inducing a draft in said gas-passage, said means comprising an axial flow propeller in a lower part of said gas-passage, and a skimmer wall having an edge inside the outer of said tubular members closely adjacent the downstream side of said propeller.

14. An invention as defined in claim 13 but further characterized by anti-whirl vanes arranged on the downstream side of said propeller.

15. An invention as defined in claim 13 but further characterized by said propeller having anti-whirl blades.

16. An invention as defined in claim 15 but further characterized by said skimmer-wall edge being radially inwardly of the tips of said blades.

17. Gas-cleaning means in accordance with claim 5 but further characterized by anti-whirl vanes between said skimmer wall-member and said inner tubular member.

18. Gas-cleaning means in accordance with claim 5 but further characterized by said skimmer wall being adjacent the tips of said blades.

19. A system of a type described for supplying clean air for a railway car having sides, a roof and a floor, said system comprising air-intake means having inlet duct-passages along said roof and air inlet-openings along the sides of the car, a pair of nested upstanding round tubes providing an upstanding air-passage therebetween, said tubes being between said sides, the upper end of the outer tube being flared, means comprising a plurality of upstanding vanes for directing air from said duct-passages into the upper part of said air-passage with the entering air flowing through said vanes along lines which, if extended, would generally clear the inner of said tubes and be approximately tangent to the inner surface of the outer tube, draft-inducing means comprising a propeller having blades in the lower part of said air-passage, a cylindrical dividing wall-member adjacent the bottom of said air-passage, spaced from and between said tubes, said wall-member terminating near but radially inwardly of the tips of said blades, and an upstanding dirt-conveying duct-means coaxial with said wall-member and extending downwardly from the space between said wall-member and the outer one of said tubes, said duct-means having a discharge-opening passing through said floor.

20. Gas-cleaning means comprising, in combination, an inner tube, an outer tube having an inner surface around and spaced from said inner tube, thereby providing a gas-passage therebetween which is generally ring-like in cross section, gas-inlet means at one end of said gas-passage, means comprising vanes at said gas-inlet means for causing the gas to whirl about said inner tube, a tubular skimmer wall-member on the downstream side of said vanes and spaced therefrom a distance in which the gas can first whirl about said inner tube before reaching said wall-member, said wall-member being arranged to skim off an outer portion of the gas flowing in said gas-passage, and an axial flow propeller having gas-moving blades adjacent the upstream edge of said wall-member.

21. Gas-treating means comprising, in combination, a round central member, an outer tubular member around and spaced from said central member, said members being tapered to provide a downwardly converging gas-passage therebetween, gas-inlet means at the large end of said gas-passage, an axial-flow-type propeller having blades in said gas-passage near the other end thereof, said propeller being spaced from said gas-inlet means, a tubular gas-divider wall-member having an edge adjacent the downstream side of the tips of said blades, said edge of said wall-member being inside said outer tubular member and radially inward from the tips of said blades.

22. Gas-cleaning means comprising, in combination, a first tube, a second tube around and spaced from said first tube, thereby providing a gas-passage therebetween, gas-inlet means at one end of said gas-passage, means for inducing a draft through said gas-passage with the gas whirling about said first tube, said means comprising an axial-flow-type propeller having blades at the other end of said gas-passage, a round gas-divider wall-member having an edge adjacent the tips of said blades, said edge of said wall-member being inside said second tube, the space between said wall-member and said second tube providing a dirt-receiving passage, and the space inside said wall-member providing a passage for cleaned gas.

23. Gas-cleaning means comprising, in combination, an inner member, an outer tubular member around and spaced from said inner member, said members being flared to provide a converging gas-passage therebetween, draft-inducing means for establishing a draft through said gas-passage, with the gas whirling about said inner member, said draft inducing means comprising a plurality of gas-deflectors at the large end of said gas-passage, and an axial-flow-type propeller in said gas-passage on the downstream side of the gas-deflectors and in a lower part of said gas-passage, said propeller having air-moving blades having faces formed for reducing the whirl of the gas.

24. A system for supplying clean air for equipment in a railway car having a roof, a floor and outer sides, said means comprising air-intake means and an air inlet opening at a side of said railway car and a duct-passage along said roof, a pair of nested upstanding downwardly tapered tubular members providing a converging air-passage therebetween, said tubular members being between said sides, said duct-passage leading to the top of said air-passage, means for inducing a downward air draft through said air-passage with the air whirling about the inner one of said tubular means, said draft-inducing means comprising stationary whirl-inducing vanes at the junction of said duct-passage and air-passage and an axial flow propeller at the bottom of said air-passage, and a skimmer wall adjacent and radially inside of the tips of said propeller, said skimmer wall having a portion extending downward from the upper edge of said wall to an opening in said floor for providing a passage through which dirt-laden skimmed off gas can be discharged.

CHARLES C. WHITTAKER

REFERENCES CITED

The following references are of record in the file of this patent:

UNITED STATES PATENTS

| Number | Name | Date |
| --- | --- | --- |
| 1,739,777 | Bernbaum et al. | Dec. 17, 1929 |
| 1,990,753 | Rapp | Feb. 12, 1935 |
| 2,053,393 | Clarkson | Sept. 8, 1936 |
| 2,142,842 | Hanson | Jan. 3, 1939 |
| 2,266,986 | Murphy | Dec. 23, 1941 |
| 2,289,910 | Hanson | July 14, 1942 |
| 2,375,203 | Appeldoorn | May 8, 1945 |
| 2,393,112 | Lincoln | Jan. 15, 1946 |

FOREIGN PATENTS

| Number | Country | Date |
| --- | --- | --- |
| 457,883 | Great Britain | Dec. 7, 1936 |